(12) United States Patent
Hiltz (10) Patent No.: US 8,210,584 B2
(45) Date of Patent: Jul. 3, 2012

(54) COLLAPSIBLE TOOL FOR TRUCK OPERATORS

(76) Inventor: Nathan Hiltz, Newmarket (CA)

( * ) Notice: Subject to any disclaimer, the term of this patent is extended or adjusted under 35 U.S.C. 154(b) by 154 days.

(21) Appl. No.: 12/483,974

(22) Filed: Jun. 12, 2009

(65) Prior Publication Data

US 2010/0024605 A1    Feb. 4, 2010

Related U.S. Application Data

(60) Provisional application No. 61/061,334, filed on Jun. 13, 2008.

(51) Int. Cl.
*A47F 13/06* (2006.01)

(52) U.S. Cl. ............... 294/24; 294/175; 294/210; 7/143; 81/177.2

(58) Field of Classification Search ............... 294/24, 294/209, 26, 175, 210; 15/144.1, 144.4; 7/143–145, 161, 166; 81/177.2, 489
See application file for complete search history.

(56) References Cited

U.S. PATENT DOCUMENTS

| | | | |
|---|---|---|---|
| 1,368,716 A | | 2/1921 | Gontrum et al. |
| 3,425,468 A | * | 2/1969 | Soucy ............................. 81/489 |
| 3,710,407 A | * | 1/1973 | Reid ................................. 7/144 |
| D240,947 S | * | 8/1976 | Pomper ........................ D21/735 |
| 4,619,464 A | | 10/1986 | Hwang |
| 4,850,079 A | * | 7/1989 | Thompson ...................... 16/421 |
| D367,140 S | | 2/1996 | Reese |
| 5,546,832 A | * | 8/1996 | Townsend ......................... 81/25 |
| 5,863,053 A | | 1/1999 | Berry |
| 6,095,532 A | | 8/2000 | Martin |
| RE37,372 E | | 9/2001 | Smith |
| 6,959,465 B1 | * | 11/2005 | Foster ............................... 7/143 |
| 7,032,908 B2 | | 4/2006 | Melvin |
| D521,840 S | * | 5/2006 | Hung ............................... D8/78 |
| 7,090,217 B1 | * | 8/2006 | Siron ........................... 273/148 R |
| 7,159,260 B2 | | 1/2007 | Hansen |
| 7,272,995 B1 | * | 9/2007 | Mavin ............................... 81/20 |
| 2003/0075384 A1 | | 4/2003 | Pickering |
| 2004/0227313 A1 | | 11/2004 | Shockley |
| 2007/0080510 A1 | | 4/2007 | Ji |

* cited by examiner

*Primary Examiner* — Dean Kramer
*Assistant Examiner* — Stephen Vu
(74) *Attorney, Agent, or Firm* — Hodgson Russ LLP (57) ABSTRACT

The present invention relates to tools employed by truck operators, and, more particularly, to such tools used to release a fifth wheel pin of a tractor/trailer assembly. Specifically, the tool is a collapsible, telescopic pin puller. The tool has a grip end having a hammer and chisel, and a pin pull end having a hook and a protruded portion. The grip end and the pin pull end are connected by a telescopic elongate central portion which retracts into a handle which can be used as the handle of the hammer.

28 Claims, 10 Drawing Sheets

COLLAPSIBLE TOOL FOR TRUCK OPERATORS

CROSS-REFERENCE TO RELATED APPLICATION

This application claims the benefit of priority to U.S. provisional patent application Ser. No. 61/061,334, filed on Jun. 13, 2008, now pending, the disclosure of which is incorporated herein by reference.

FIELD OF THE INVENTION

The present invention relates to tools employed by truck operators, and, more particularly, to such tools used to release a fifth wheel pin of a tractor/trailer assembly.

BACKGROUND OF THE INVENTION

Truck operators are often required to perform minor repair and maintenance on their trucks, including connecting or disconnecting the tractor from their trailer, checking the tire air pressure, removing debris from the underside of a trailer, raising and lowering hydraulic landing gear when a trailer is disconnected from a trailer, and tightening loose connectors on the trailer.

Unfortunately, truck operators are often on the road when they are required to perform these tasks, and, due to the limited space in the tractor portion of the truck, have a limited amount of tools for performing these duties.

One example of a task required of a truck operator is the disconnection of a fifth wheel pin employed to connect the trailer to the tractor. The fifth wheel pin is located between the tractor and the trailer, above the rear tires of the tractor. The truck operator is expected to bend down and reach between the tractor and the trailer, past one set of rear tires, to pull the fifth wheel pin. This action requires operators to contort themselves into an awkward position while pulling the pin, and often results in strains to the shoulders, elbows, wrists and backs. Since the pulling of the pin is often done by a roadside, or in a parking lot, the truck operator is sometimes in an awkward and vulnerable position while performing this operation, since other trucks or cars may be driving past. The faster the operator is able to pull the pin, the less risk there is of injury due to third party action.

Truck operators are often also required to connect the fifth wheel pin, or to ensure the fifth wheel pin is properly connected. The operation is similar to that of the disconnection of the fifth wheel pin, described above, only in many cases the operator must push onto the pin to ensure that it is engaged.

Another minor task undertaken by the truck operator is the checking of the tire air pressure. This is often done by banging a butt bar (a straight piece of metal about 1-2 feet in length) onto the tires to test their air pressure.

Truck operators also often need to raise or lower the hydraulic landing gear on which the trailer rests when it is not hooked up to the tractor. Hydraulic landing gear often stick or seize, due to debris, temperature extremes, or other exposure or damage while on the road. Truck operators often have to scrape away this debris, or hammer at the landing gear to get it to operate.

In many instances, these operations need to be done in sub-optimal lighting conditions. Even at mid-day, the location of the fifth wheel pin (between the tractor and the trailer, behind the wheels of the tractor) make it hard to see. However, these operations often need to be done at night, especially in stressful, emergency-type situations.

Pin pull tools are known in the art. For example, U.S. Pat. No. 5,201,559 describes a king pin release tool, for use when releasing the king pin from a fifth wheel coupling mechanism. Multi-use tools for truckers, including pin pulls, are also known, such as those described in U.S. Pat. Nos. 6,354,642, 4,050,107, and 5,344,201. However, these tools are long and awkward, and, where space is limited (such as in a tractor cab), may not be desirable.

Telescoping poles for a variety of uses are also known, and described in U.S. Pat. Nos. 6,378,922, 6,450,557, 6,293,601, 4,881,338, and 5,003,437.

SUMMARY OF THE INVENTION

According to one aspect of the invention is provided a tool, comprising a collapsible, elongate central portion, comprising a plurality of elongate members, said plurality of elongate members capable of telescoping into one another; wherein the elongate central portion has at least two positions; a closed position wherein the elongate members are telescoped into one another such that a first elongate member is external to the remaining elongate members and forms a handle portion; and an open position wherein the elongate members are extended out from one another; a grip portion projecting from a first end of the elongate central portion; an arm portion projecting from a second end of the elongate central portion, said arm portion comprising a hook portion and a protruded portion; a hammer head extending from a hammer end of the grip portion; and a locking mechanism whereby the tool can be locked in the closed position.

In one embodiment, the grip portion is affixed to the handle.

In another embodiment, the locking mechanism comprises a screw on a grip end of the elongate member most proximal to the arm portion, and a bolt in the handle whereby, in or when approaching the closed position, the screw is able to engage the bolt, locking the tool in the closed position.

In yet a further embodiment, the locking mechanism comprises a bolt on a grip end of the elongate member most proximal to the arm portion, and a screw in the handle or in the grip portion inside the handle, whereby, in or when approaching the closed position, the screw end is able to engage the bolt, locking the tool in the closed position.

In a further embodiment, the locking mechanism comprises a friction fit.

In a further embodiment, the tool comprises a second locking mechanism whereby the tool can be locked in the open position.

In yet a further embodiment, the second locking mechanism comprises a friction fit.

In yet a further embodiment, the second locking mechanism comprises a tongue and groove assembly within each elongate member.

In yet a further embodiment, the tool comprises a chisel extending from a chisel end of the grip portion, said chisel end being opposite the hammer end.

In yet a further embodiment, the tool comprises a grip on said grip portion. In various embodiments, the grip is imbedded into, applied onto, or a series of indentations found within, said grip portion.

In a further embodiment, the protruded portion has a magnetic end.

In yet a further embodiment, the magnetic end is proximal to, embedded into, or abutting from said protruded portion.

In a further embodiment, the tool further comprises a screw guide proximal to the bolt, and capable of guiding the screw into the bolt.

In yet a further embodiment, the screw guide is metal.

In a further embodiment, the tool comprises a bolt guide proximal to the screw, and capable of guiding the bolt into the screw.

In yet a further embodiment, the bolt guide is metal.

In a further embodiment, the tool further comprises a light, for example, an LED light, on said arm portion.

In yet a further embodiment, the tool comprises a light switch on said grip portion, said light switch capable of operating said light in either the open position or the closed position.

In another embodiment, the tool comprises a power supply within the grip portion, or within the handle, for powering said light.

In another embodiment, the tool further comprises a shield projecting radially from the arm portion or the elongate member most proximal to the arm portion, such shield forming a seal or engaging with the first elongate member when the tool is in the closed position.

In yet another embodiment, the locking mechanism comprises a pin on the arm portion, or on the elongate member most proximal to the arm portion, and a notch on the first elongate member, whereby the pin can be positioned within the notch or can engage the notch.

In a further embodiment, the pin can be biased in a locking position by means of a spring located in the first elongate member and compressing when the tool approaches the closed position.

BRIEF DESCRIPTION OF THE DRAWINGS

FIGS. 3 A-E show a second embodiment of the telescoping multifunction tool.

DETAILED DESCRIPTION OF THE INVENTION

Figure 1:
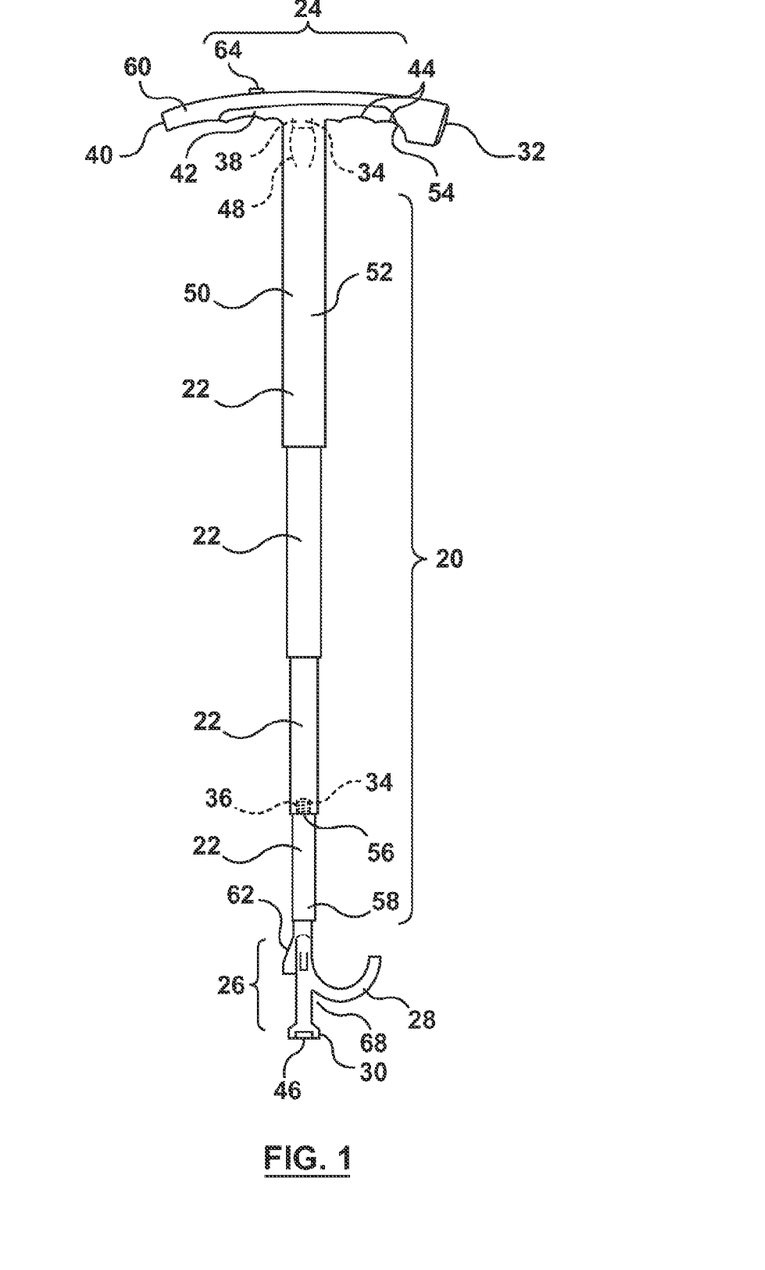
FIG. 1 is an illustration of a telescoping multifunction tool according to one embodiment of the present invention, shown in its open position.
Figure 2:
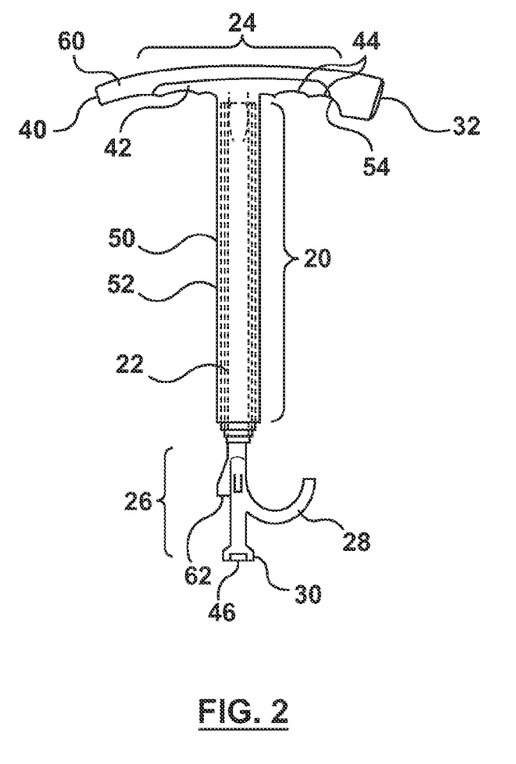
FIG. 2 is an illustration of the telescoping multifunction tool of FIG. 1, in its closed position.

FIGS. 1 and 2 show one embodiment of the present invention. FIG. 1 shows the tool in its open configuration; FIG. 2 shows the same tool in its closed configuration.

The tool has an elongate central portion 20 made up of a plurality of elongate members 22, a grip portion 24 proximal to a first elongate member 52, and an arm portion 26 proximal to or forming the end of the elongate member 22 furthest from the first elongate member 52.

There can be as few as 2 elongate members 22, and as many as desirable. The number of elongate members 22 is determined by the desired length of the tool when in the open position, and the desired length of the tool when in the closed position. Typically, there are 3-7 elongate members 22; as shown, there are 4. Included in the elongate members 22 is handle 50, which is the elongate member with the widest diameter. The other elongate members 22 can slide into the handle 50, to place the tool in a closed configuration, as shown in FIG. 2. Ideally and as shown, but not necessarily, the first elongate member 52 (i.e. the elongate member 22 closest to the grip portion 24) is the widest in diameter (and is thus the handle 50), though it would be evident to a person skilled in the art that another elongate member 22, for example, the elongate member 22 most proximal to the arm portion 26, could be the widest in diameter and therefore serve as the handle.

As shown, the first elongate member 52 is the handle 50, which offers certain advantages. For example, as shown, the first elongate member 52 is fused to and forms a "one piece unit" with the grip portion 24. This provides the advantage that when the chisel 40 or hammer head 32 are used, a user can grip the handle 50 without worrying about the grip twisting and turning.

The grip portion 24 comprises a hammer end 54 and a chisel end 60. At the end of the hammer end 54 furthest from the handle 50 is a hammer head 32. At the end of the chisel end 60 furthest from the handle 50 is a chisel 40. The hammer end 54 and the chisel end 60, as shown, are at a 180° angle from one another.

In one embodiment, and as shown, the grip portion 24 also comprises a grip 42. The grip 42 may be in the form of a rubber covering, or it may simply be a non-slip paint or similar coating. The grip 42 comprises indentations 44. When in use as a pin puller, the user would hold the tool by the grip 42, with each finger falling into an indentation 44.

Grip portion 24 also comprises a light switch 64, that operates light 62. As shown, the light 62 is on the arm portion 26.

Arm portion 26 also comprises hook portion 28 and protruded portion 30. When extended into the open position (as shown in FIG. 1), the hook portion 28 can be hooked onto a king pin, to facilitate pulling the pin. The protruded portion 30 can be used to push onto a king pin, or for any other use where pushing is desired. The cleft area 68 between the hook portion 28 and the protruded portion 30 can also be used to push a king pin, by wedging the pin in this space.

Arm portion 26 as shown comprises a magnetic end 46 at the protruded portion. This way, the protruded portion can be used to pick up metallic objects, such as nails, screws, keys, etc., that may have fallen into small holes or gaps, or under the tractor or trailer.

Arm portion 26 also comprises a light 62, as shown, an array of light emitting diodes. This light 62 enables the user to see exactly where the arm portion 26 is pointed. The light 62 can be turned on or off from the grip portion 24 using light switch 64.

Figure 10:
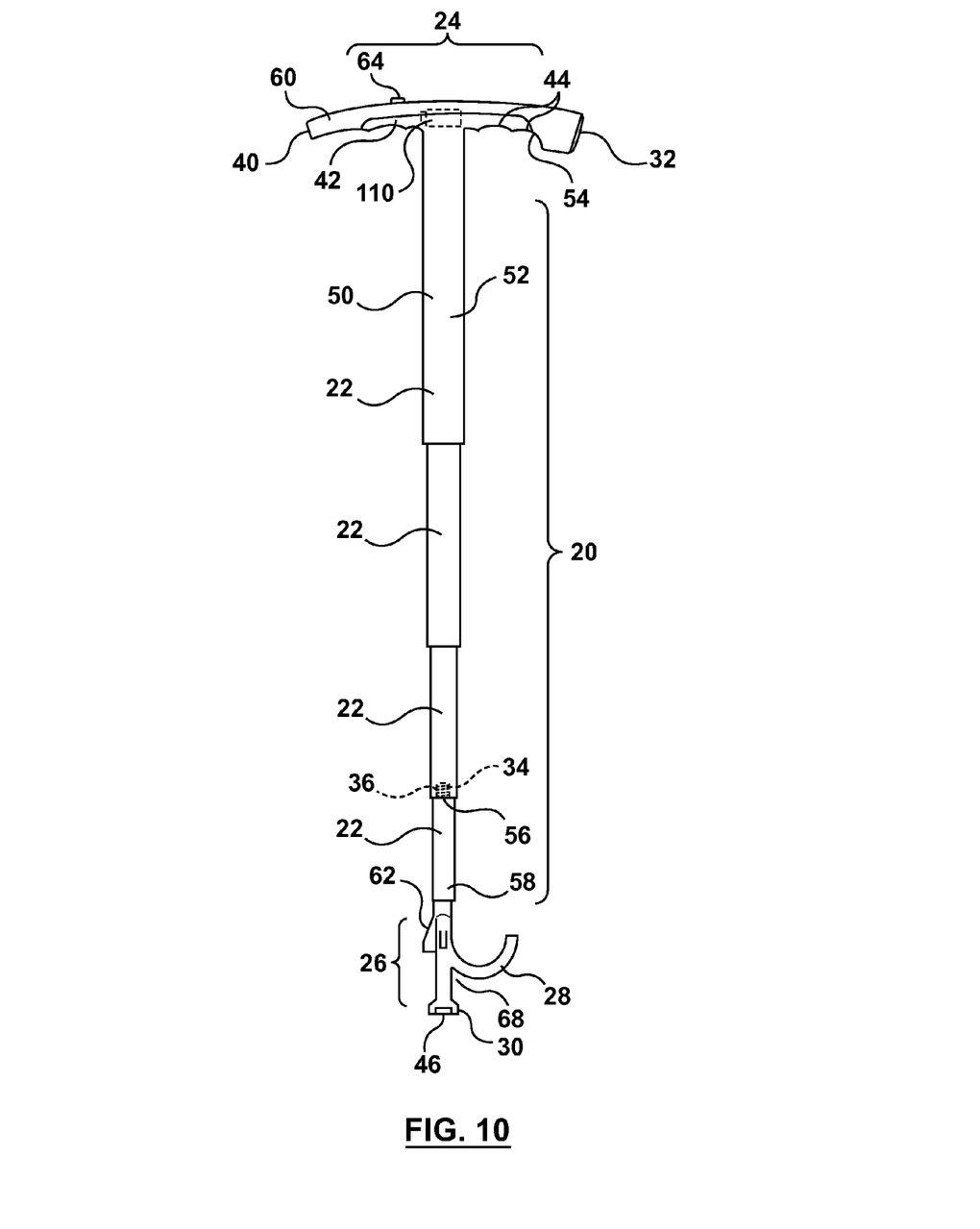
FIG. 10 is an illustration an example telescoping multifunction tool in an open position.
Figure 11:
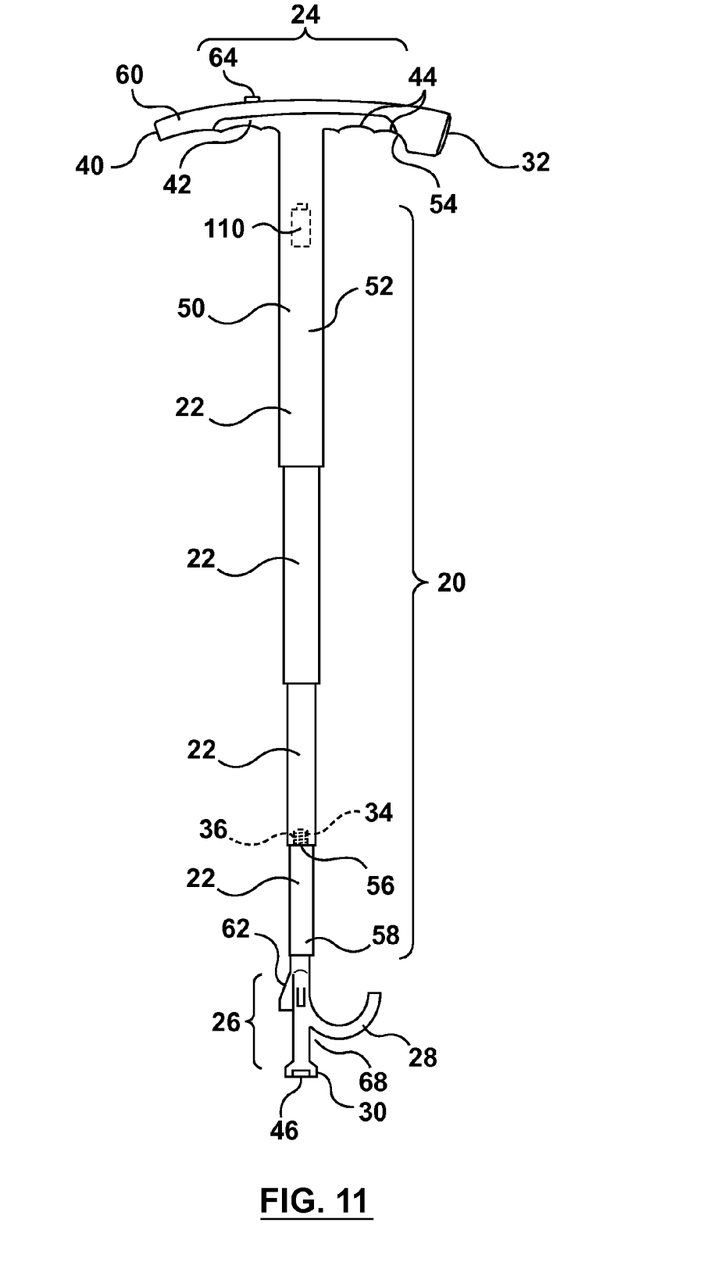
FIG. 11 is an illustration an example telescoping multifunction tool in an open position.

FIG. 10 shows an example tool having a power supply 110 within the grip portion 24 for powering the light 62. FIG. 11 shows an example tool having a power supply 110 within the handle portion 50 for powering the light 62.

Figure 8:
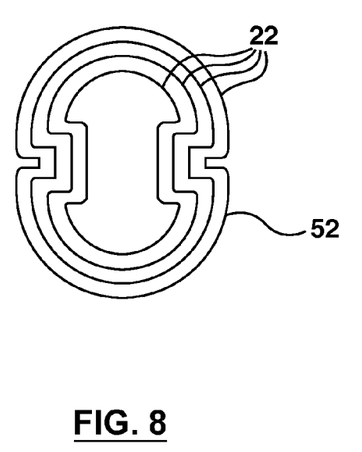
FIG. 8 is an illustration of an example cross-sectional view of an elongate central portion of an example telescoping multifunction tool.

The elongate members 22 can be locked in the open position, as shown in FIG. 1. The elongate members 22 are shown locked in the open position using a friction fit, meaning that the elongate members 22 each taper slightly and can be forced into a locked position by pulling hard as a user moves from the closed position to the open position. Protruded portion 30 can also therefore be used to unlock the elongate members; by holding the grip portion 24 and hitting the protruded portion 30 against a hard object, the elongate members 22 collapse into one another. Elongate members 22 can also be locked into an open position using any other means, such as a tongue and groove system (as illustrated for example in FIG. 8). Another means for locking the elongate members in an open position include one or more ball bearings biased to protrude from each of the elongate members, and a hole in the next elongate member, such that the ball bearing fits into the hole when in position. Such a means would require either pressure on the elongate members to displace the ball bearing, or pressure on the ball bearings themselves. Optionally, the ball bearings can be connected internally by a wire or spring to facilitate closure of the telescoping members into the closed position by releasing the ball bearings from the apertures simultaneously, for example by pushing one button connected to all of the ball bearings in this manner. Another possible means includes a twist lock mechanism, where, after extending each elongate member, the member must be twisted to lock it onto the next elongate member.

The elongate members 22 can also be locked in a closed position, as shown in FIG. 2. Locking mechanism 34 comprises a screw 36 located on the grip end 56 of the elongate member 22 closest to the arm portion 26, and a bolt 38 located inside the first elongate member 52, proximal to the grip portion 24. Once the elongate members 22 are collapsed, the screw 36 can be screwed onto the bolt 38, to lock the elongate members 22 in a closed position. The positions of screw 36 and bolt 38 can be reversed without changing the essence of the invention. To facilitate engaging screw 36 onto bolt 38 is provided screw guide 48 a set of curved protrusions that aid in pointing the screw 36 towards bolt 38. Other means for locking in a closed position can be used, for example, similar to the means described above for locking the elongate members in an open position. Yet other means for locking or biasing in a closed position may include a magnetic means, for example, having a magnet in the inside of the grip portion 24 that would connect with a second magnet on the grip portion end of the elongate member 22 most distal to grip portion 24. When closed, the magnetic force exerted between the magnets would bias the tool in the closed position; additional force would be required to open the tool to disrupt the force of the magnets.

Figure 9:
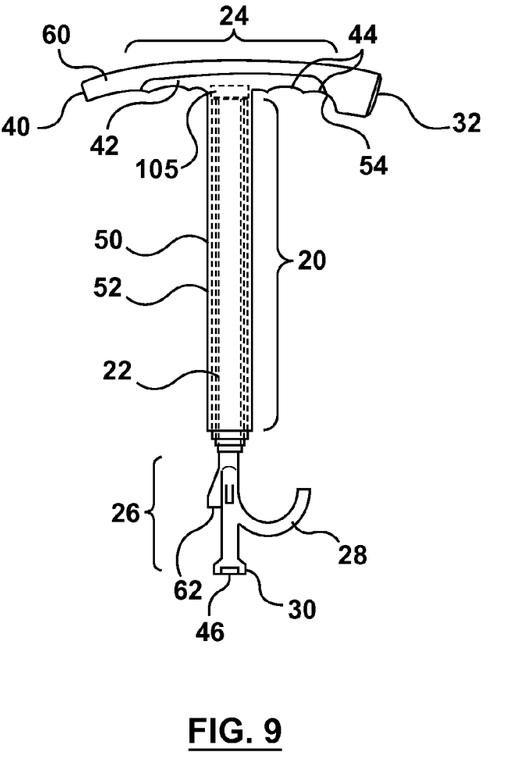
FIG. 9 is an illustration of an example telescoping multifunction tool in a closed position.

FIG. 9 shows an example tool having a magnet 105 inside the grip portion 24 for exerting a magnetic force on at least one of the elongate members 22 to bias the elongate central portion 20 in the closed position.

As would be readily evident to a person skilled in the art, by locking certain elongate members 22 in a collapsed position, and other elongate members 22 in an extended position, one can also provide a tool with a length somewhere between the open position and the closed position. In certain embodiments, this can also be achieved by creating an intermediate locking mechanism, where the elongate members 22 are partially collapsed into one another.

Figures 3A, 3C, 3D, 3E:
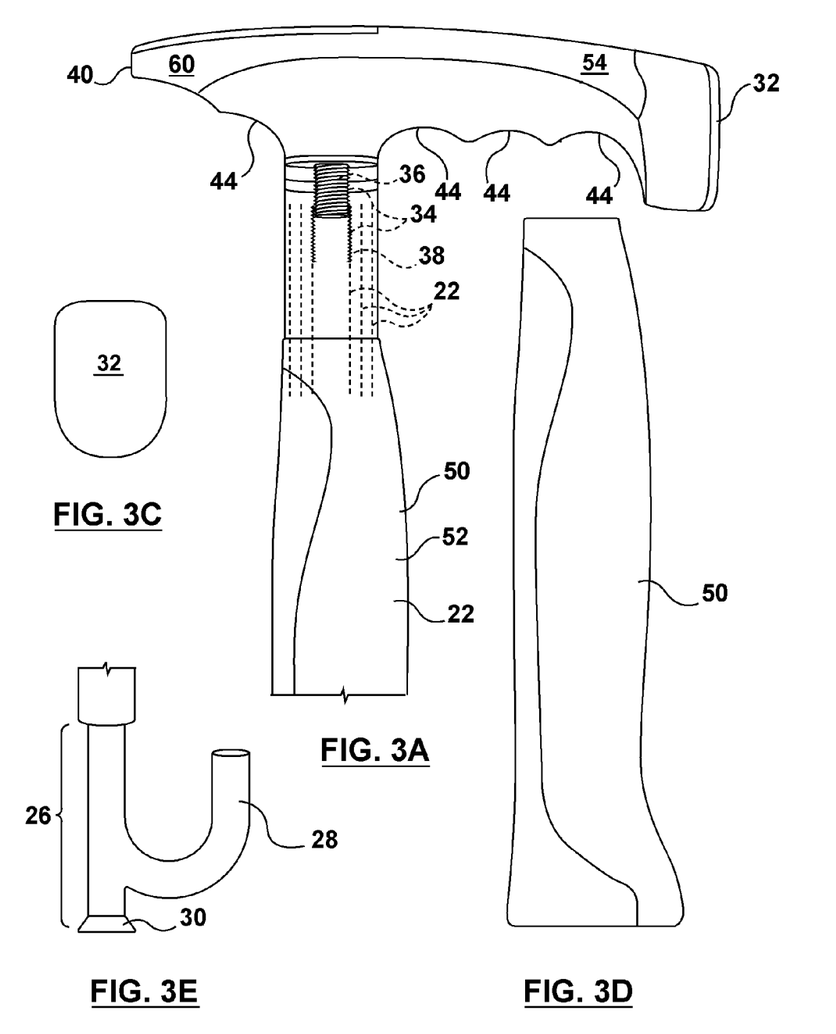
FIG. 3A shows a side view of the grip portion and handle, with the elongate members in the closed position, and shows a cutaway view of the elongate members within said handle, including the locking mechanism.
FIG. 3C shows the hammer head in isolation.
FIG. 3D shows a side view of the handle in isolation.
FIG. 3E shows the arm portion.
Figure 3B:
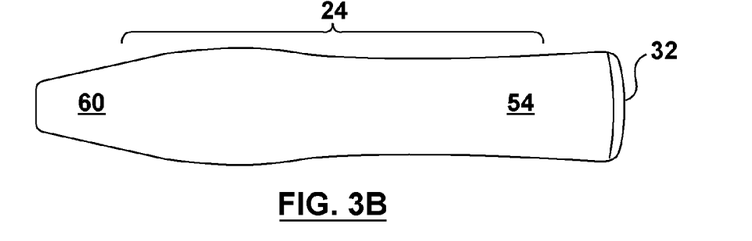
FIG. 3B shows a top view of the tool.

FIG. 3 shows an alternative embodiment of the present invention. FIG. 3A shows the locking mechanism for locking elongate members 22 into closed position in greater detail, including screw 36, bolt 38, and elongate members 22. FIG. 3B shows the shape of the grip portion 24, as seen from above. FIG. 3C shows the shape of the hammer head 32. FIG. 3D shows a shape for handle 50, whereas FIG. 3E shows an alternative design for arm portion 26.

Figure 4:
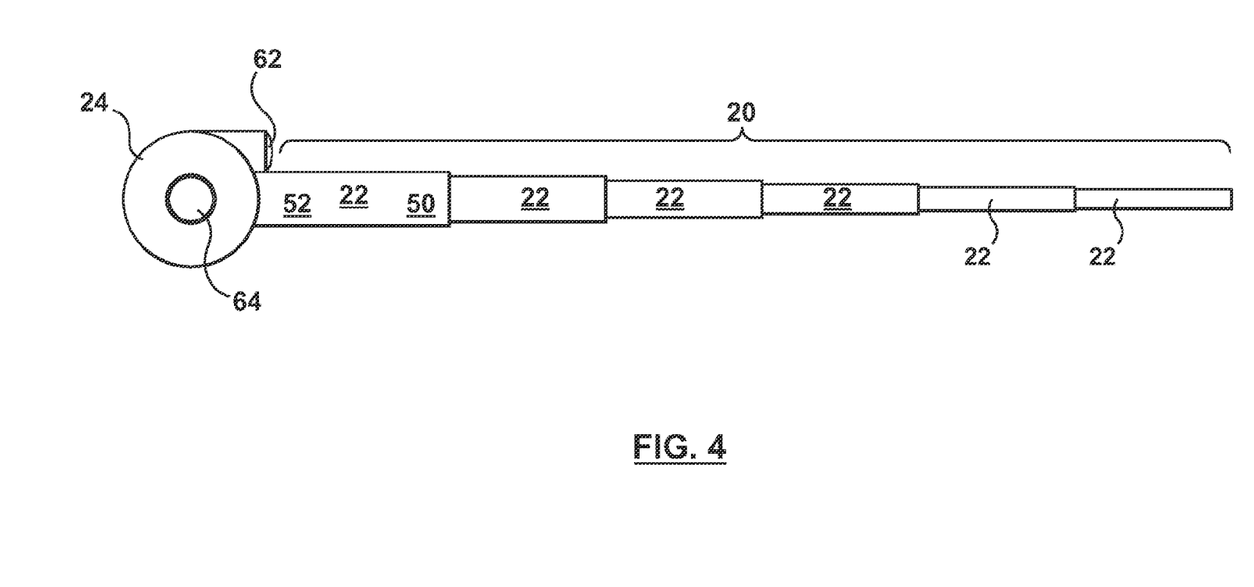
FIG. 4 shows the side view of an alternative embodiment of the tool, shown in its open position.
Figure 5:
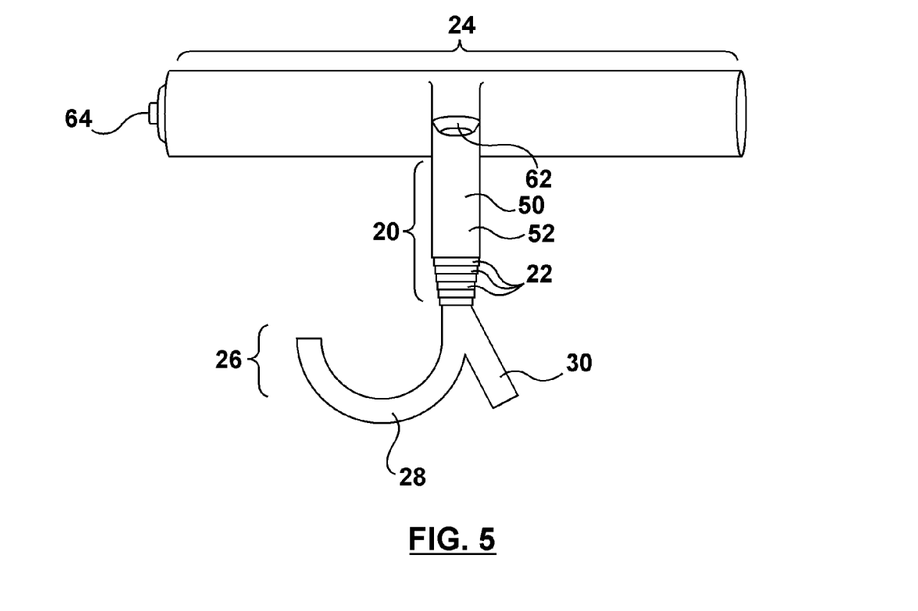
FIG. 5 is a top view of the multifunction tool of FIG. 4, shown in its closed position.

FIGS. 4 and 5 show an open and closed configuration, respectively, of an alternative embodiment of the present invention. In this embodiment, light 62 is located on the grip portion 24, instead of on the arm portion 26. Also shown is an alternative shape for the grip portion 24, and alternative positioning of light switch 64. Also shown is an alternative embodiment of arm portion 26.

Figure 6:
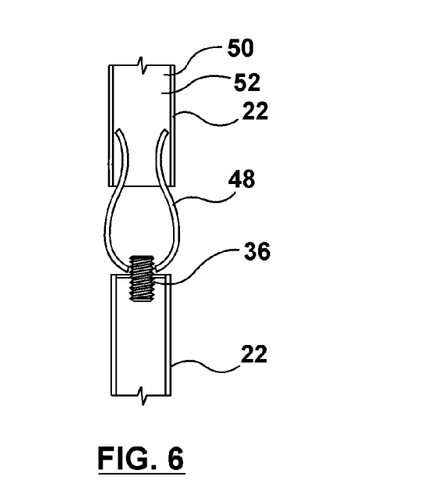
FIG. 6 shows the screw, bolt, and screw guide according to one embodiment of the invention, in isolation.

FIG. 6 shows the closed configuration locking mechanism 34, including screw guide 48, in greater detail. As can be seen, elongate member 22 has a screw end 36, and screw guide 48, which helps guide handle 50 to the right position, to allow affixing of screw end 36 onto bolt (not shown).

Figure 7:
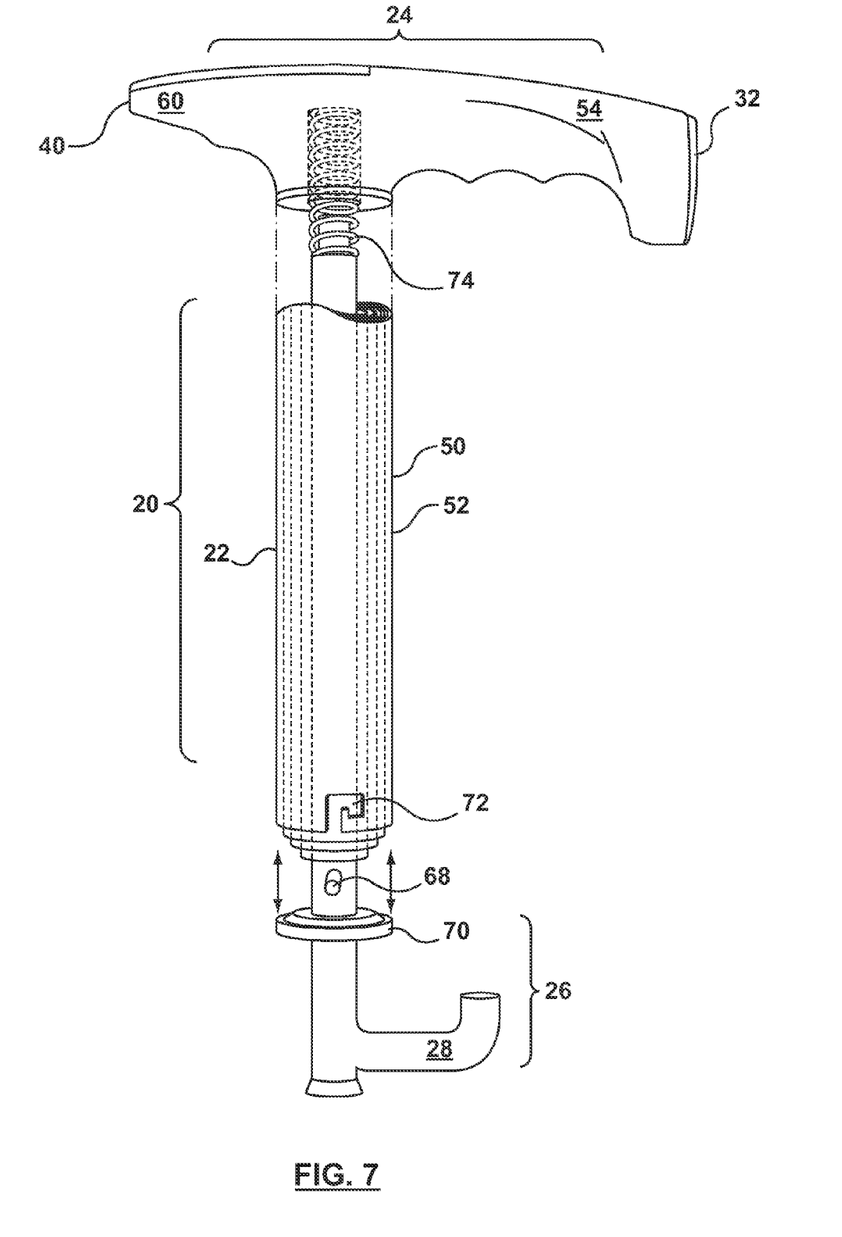
FIG. 7 shows an alternative embodiment of the locking mechanism.

FIG. 7 shows an alternative configuration of the closed configuration locking mechanism. A pin 68 is located on the elongate member 22 most proximal to the arm portion 26. The pin 68 can be fed into notch 72, located on first elongate member 52, and, by twisting the arm portion 26 relative to the first elongate member 52, can be locked into the closed position due to biasing means, shown as compression spring 74. FIG. 7 also shows a shield 70 which can be used to help align the elongate members 22 in the closed position, and can provide a seal so that, when in the closed position, dirt and dust is shielded from entering the hollow portion of first elongate member 52.

The shield 70 can also provide an alternative locking mechanism for locking the tool in the closed configuration. In this alternative locking mechanism, the shield 70 is threaded, and can screw into the end of the first elongate member 52.

While a preferred embodiment of the invention has been described using specific terms, such description is for illustrative purposes only, and is to be understood that changes and variations may be made without departing from the spirit or scope of the following claims. All cited documents are herein incorporated by reference thereto.

The invention claimed is:

1. A tool comprising:
    a. a collapsible, elongate central portion comprising a plurality of elongate members, said plurality of elongate members capable of telescoping into one another; wherein the elongate central portion has at least two positions; a closed position wherein the elongate members are telescoped into one another such that a first elongate member is external to the remaining elongate members and forms a handle portion; and an open position wherein the elongate members are extended out from one another;
    b. a grip portion projecting from the first elongate member at a first end of the elongate central portion;
    c. an arm portion projecting from a second end of the elongate central portion, said arm portion comprising a hook portion and a protruded portion;
    d. a hammer head extending from a hammer end of the grip portion; and
    e. a locking mechanism whereby the tool can be locked in the closed position.

2. The tool of claim 1, wherein the grip portion is affixed to the handle portion.

3. The tool of claim 1, wherein the locking mechanism comprises a screw on a grip end of the elongate member most proximal to the arm portion, and a bolt in the handle portion whereby, in or when approaching the closed position, the screw is able to engage the bolt, locking the tool in the closed position.

4. The tool of claim of claim 3, further comprising a screw guide proximal to the bolt, and capable of guiding the screw into the bolt.

5. The tool of claim 4, wherein the screw guide is metal.

6. The tool of claim 3, further comprising a bolt guide proximal to the screw, and capable of guiding the bolt into the screw.

7. The tool of claim 6, wherein the bolt guide is metal.

8. The tool of claim 1, wherein the locking mechanism comprises a bolt on a grip end of the elongate member most proximal to the arm portion, and a screw in the handle portion or in the grip portion inside the handle portion, whereby, in or when approaching the closed position, the screw end is able to engage the bolt, locking the tool in the closed position.

9. The tool of claim 1, wherein the locking mechanism comprises a friction fit.

10. The tool of claim 1, wherein the locking mechanism comprises a pin on the arm portion, or on the elongate member most proximal to the arm portion, and a notch on the first elongate member, whereby the pin can be positioned within the notch or can engage the notch.

11. The tool of claim 10, whereby the pin is biased in a locking position by means of a spring located in the first elongate member and compressing when the tool approaches the closed position.

12. The tool of claim 1, further comprising a second locking mechanism whereby the tool can be locked in the open position.

13. The tool of claim 12, wherein the second locking mechanism comprises a friction fit.

14. The tool of claim 12, wherein the second locking mechanism comprises a tongue and groove assembly within each of the elongate members.

15. The tool of claim 1, further comprising a chisel extending from a chisel end of the grip portion, said chisel end being opposite the hammer end.

16. The tool of claim 1, further comprising a grip on said grip portion.

17. The tool of claim 16, wherein the grip is imbedded into said grip portion.

18. The tool of claim 16, wherein the grip is applied onto said grip portion.

19. The tool of claim 16, wherein the grip is a series of indentations in said grip portion.

20. The tool of claim 1, wherein the protruded portion has a magnetic end.

21. The tool of claim 20, wherein the magnetic end is proximal to, embedded into, or abutting from said protruded portion.

22. The tool of claim 1, further comprising a light on said arm portion.

23. The tool of claim 22, further comprising a light switch on said grip portion, said light switch capable of operating said light in either the open position or the closed position.

24. The tool of claim 22, further comprising a power supply within the grip portion, for powering said light.

25. The tool of claim 22, further comprising a power supply within the handle portion for powering said light.

26. The tool of claim 22, wherein the light is an LED.

27. The tool of claim 1, further comprising a shield projecting radially from the arm portion or the elongate member most proximal to the arm portion, such shield forming a seal or engaging with the first elongate member when the tool is in the closed position.

28. The tool of claim 1, further comprising a magnet inside the grip portion for exerting a magnetic force on at least one of the elongate members to bias the elongate central portion in the closed position.

* * * * *